United States Patent [19]

Takahashi

[11] Patent Number: 4,994,741
[45] Date of Patent: Feb. 19, 1991

[54] MAGNETIC MOTION SENSING DEVICE FOR SENSING INCLINATION AND SWAYING

[75] Inventor: Toshiaki Takahashi, Iwaki, Japan

[73] Assignee: Alpine Electronics Inc., Tokyo, Japan

[21] Appl. No.: 478,799

[22] Filed: Feb. 12, 1990

[30] Foreign Application Priority Data

Feb. 13, 1989 [JP] Japan ................................. 1-33256

[51] Int. Cl.$^5$ .......................... G01B 7/14; G01C 9/06
[52] U.S. Cl. .......................... 324/207.23; 324/207.21; 33/366
[58] Field of Search ...................... 324/207.21, 207.24, 324/207.22, 207.23, 207.11, 207.25, 207.14, 226; 33/366

[56] References Cited

U.S. PATENT DOCUMENTS 4,557,056 12/1985 Kim et al. ............................. 33/366
4,628,259 12/1986 Takahashi et al. .................. 324/252
4,629,982 12/1986 Kieslich .

Primary Examiner—Walter E. Snow
Attorney, Agent, or Firm—Guy W. Shoup; Norman R. Klivans

[57] ABSTRACT

A motion detecting device comprises an encoder for generating two signals of A phase and B phase, 90° out of phase with each other, when a member being measured is subject to an inclination or swaying. A pulse generation section generates a positive pulse or a negative pulse, depending on the direction of the inclination, at each of the leading and trailing edges of the A phase and B phase signals. An up/down counter counts up or down the positive or negative pulses, respectively, and an inclination detection section outputs an inclination generation signal when the member being measured is sufficiently inclined, in either a positive or negative direction, so as to cause a counter value to be above a first set value or below a second set value.

7 Claims, 7 Drawing Sheets

MAGNETIC MOTION SENSING DEVICE FOR SENSING INCLINATION AND SWAYING

BACKGROUND OF THE INVENTION

1. Field of the Invention

The present invention relates to a motion sensing device and more particularly to a motion sensing device which detects motion such as inclination or swaying applied to a member, such as a vehicle, being measured.

2. Description of the Related Art

A conventional theft prevention device for vehicles detects swayings, inclinations, or impacts above a predetermined amplitude and sounds an alarm.

A motion sensing device of the prior art used in such a theft prevention device incorporates a pendulum containing a magnet and magnetic resistance elements mounted on a bracket directly under the pendulum in the vertical direction. The motion sensing device detects swaying, inclination, or impact on the basis of variations in the resistance of the magnetic resistance elements produced when the pendulum vibrates or inclines as a result of the vibration or inclination of a vehicle being measured.

However, the prior art motion sensing devices have a drawback in that the pendulum must initially be centered with respect to the magnetic resistance elements so that the center of the magnetic resistance elements oppositely face the pendulum each time the vehicle is parked on an incline.

The prior art motion sensing devices also have a drawback in that detection of an incline with high precision cannot be achieved, since the devices determine inclines based on the level of an analog signal produced by resistance variations in the magnetic resistance elements

SUMMARY OF THE INVENTION

An object of the present invention is to provide a motion sensing device which does not require centering and which is capable of sensing inclinations and swayings with high precision using digital signals generated using an encoder.

The above-mentioned objects are attained by using an encoder for generating two signals of A phase and B phase, a pulse generation section for generating a positive pulse train or a negative pulse train of one-quarter cycle of the A phase and B phase signals, an up/down counter, and an inclination detection section and a swaying detection section for sensing inclinations and swayings, respectively, on the basis of a counter value outputted by the up/down counter.

A positive pulse train or a negative pulse train is generated, depending on the direction of the inclination of a member being measured, on the leading and trailing edges of two signals of A phase and B phase generated from the encoder. The positive pulses and the negative pulses are counted up or down, and when the count value falls within a first set range, it is determined that an inclination has occurred. When the count value falls within a second set range, it is determined that a swaying, or excessive inclination, has occurred.

DETAILED DESCRIPTION OF PREFERRED EMBODIMENTS

Figure 1:
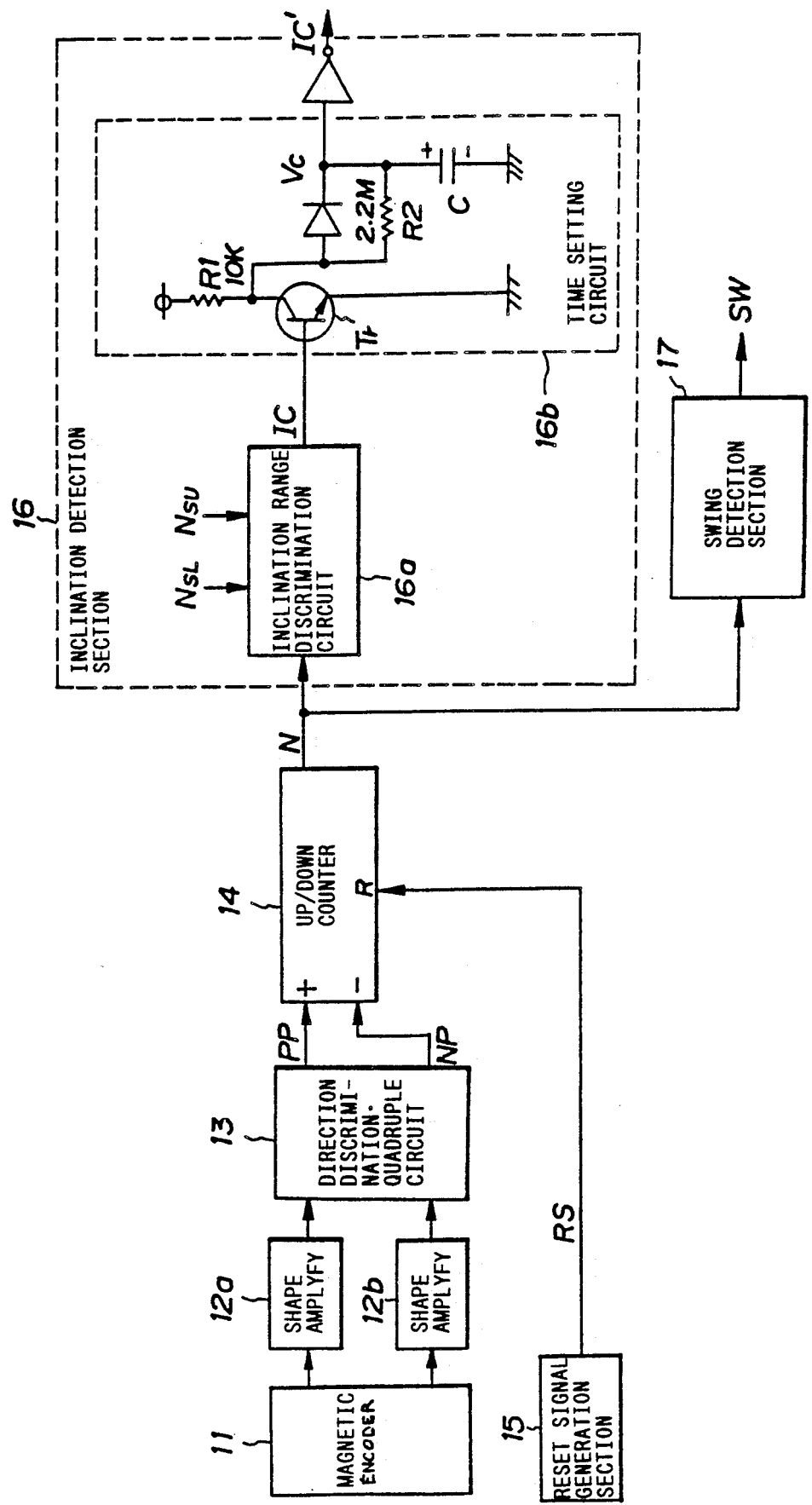
FIG. 1 is a block diagram of a motion detecting device in accordance with the present invention.

FIG. 1 is a block diagram of a motion sensing device in accordance with the present invention. In the figure is shown a magnetic encoder 11, which includes a pendulum, a magnetic drum which rotates according to the movement of the pendulum, and magnetic resistance elements (MR elements) disposed in opposition to the magnetic drum and which generate two signals of A phase and B phase, 90° out of phase with each other, when a member, such as a vehicle, being measured is subjected to a vibration or inclination.

Figure 2A:
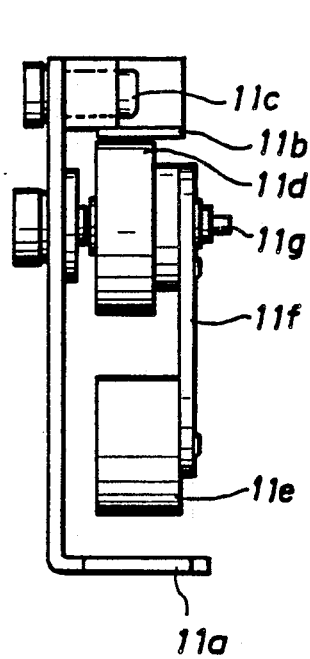
FIGS. 2(a) and 2(b) are side and frontal views, respectively, of a magnetic encoder in accordance with the present invention.
Figure 2B:
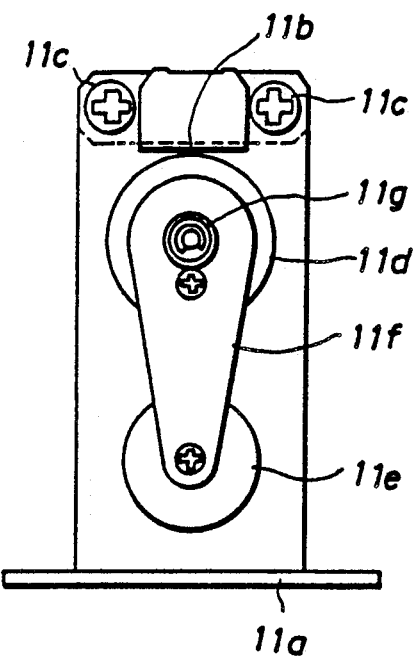

FIGS. 2(a) and 2(b) are views of such a magnetic encoder. FIG. 2(a) is a side view thereof and FIG. 2(b) is a front view thereof. The reference numeral 11a denotes a mounting member in the form of the letter L on its side surface, and numeral 11b denotes a magnetic sensor. The magnetic sensor 11b comprises a magnetic resistance element main body of a permalloy thin-film pattern formed on a glass surface and an electric circuit for generating two signals of A phase and B phase which are 90° out of phase with each other. Numeral 11c denotes a screw for mounting the magnetic sensor 11b to a mounting member. Numeral 11d denotes a magnetic drum which is magnetized at a predetermined pitch around its circumferential surface and has a small portion of its periphery which oppositely faces the magnetic sensor 11b. Numeral 11e denotes a pendulum, which is attached to one end of suspender 11f, where the other end of suspender 11f is fixed to magnetic drum 11d, for rotating the magnetic drum 11d in accordance with the movement of the pendulum 11e. Numeral 11g denotes a supporting section rotatably supporting the magnetic drum 11d and the suspender 11f.

When a member to which the magnetic encoder of FIG. 2 is mounted vibrates or inclines, the pendulum 11e vibrates or inclines so as to continuously align with the vertical direction. The magnetic drum 11d rotates due to the relative movement of pendulum 11e and a two-phase signal is outputted from the magnetic sensor 11b.

FIGS. 3a-3d illustrate the operating principles of the magnetic encoder of FIG. 2. Magnetic resistance elements MRa, MRb have characteristics such that the electrical resistance value R is decreased when a current is supplied in the longitudinal direction of a pattern and a magnetic field intersecting at right angles to the current exists. For this reason, when the patterns of the magnetic resistance elements MRa, MRb are positioned relative to a magnetization pattern, such as that on magnetic drum 11d, such that magnetic resistance elements MRa, MRb are placed λ/2 (λ indicates a pitch of the magnetization pattern) out of phase with each other, the resistance value of the magnetic resistance elements MRa, MRb alternate between large and small as the magnetization pattern moves. In the state shown in FIG. 3(a), the resistance value of the magnetic resistance element MRa is small, and the resistance value of the magnetic resistance element MRb is large. As a result of this, an A.C. signal output can be obtained from the output terminal OUT, shown in FIG. 3(b), as drum 11d rotates and the magnetization pattern moves.

Figure 3A:
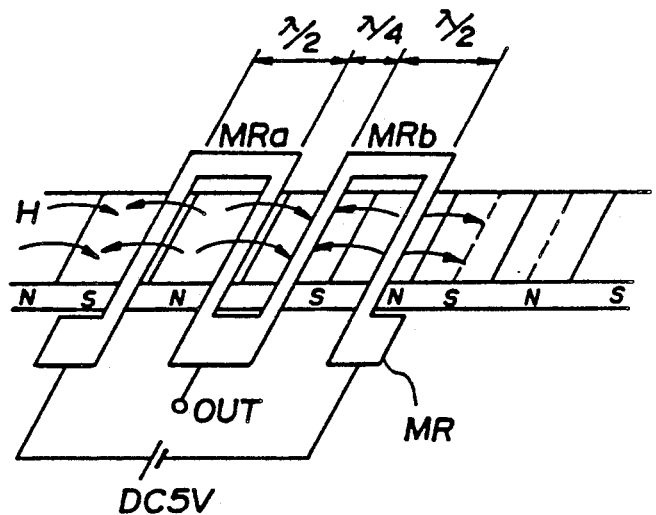
FIGS. 3(a)-3(d) illustrate the operating principles of the magnetic encoder of FIGS. 2(a) and 2(b)
Figure 3B:
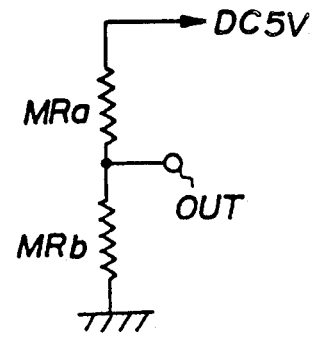
Figure 3C:
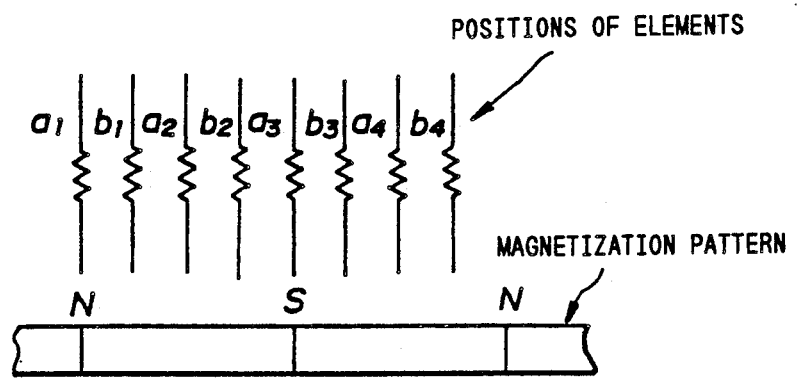
Figure 3D:
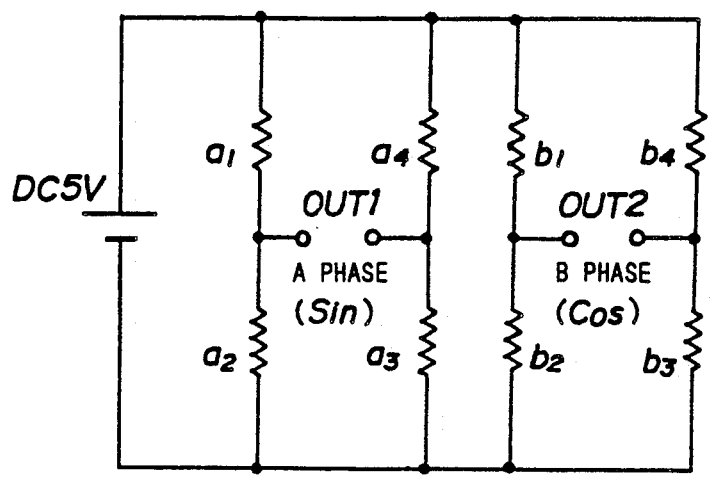

In practice, as shown in FIGS. 3(c) and 3(d), an output voltage of the magnetic encoder is increased, and the temperature characteristics thereof are improved, by combining magnetic resistance elements $a_i$ (i = 1 to 4) and $b_i$ (i = 1 to 4) into a bridge configuration. An A phase signal output and a B phase signal output can be obtained from the output terminal OUT1 and the output terminal OUT2, respectively, by arraying the magnetic resistance element bi at a position ¼ wavelength from magnetic resistance element ai with respect to the magnetization pitch of the drum.

Referring back to FIG. 1, numerals 12a, 12b denote shaping and amplifying circuits which shape and amplify the waveform of the two-phase signal generated by encoder 11 and generate two-phase square wave signals corresponding to the A phase and B phase signals generated by encoder 11. Numeral 13 denotes a direction discrimination•quadruple circuit, which generates a positive pulse train PP or a negative pulse train NP according to the direction of a vibration or an inclination at each of the leading or trailing edges of the A phase and B phase signals.

Figure 4:
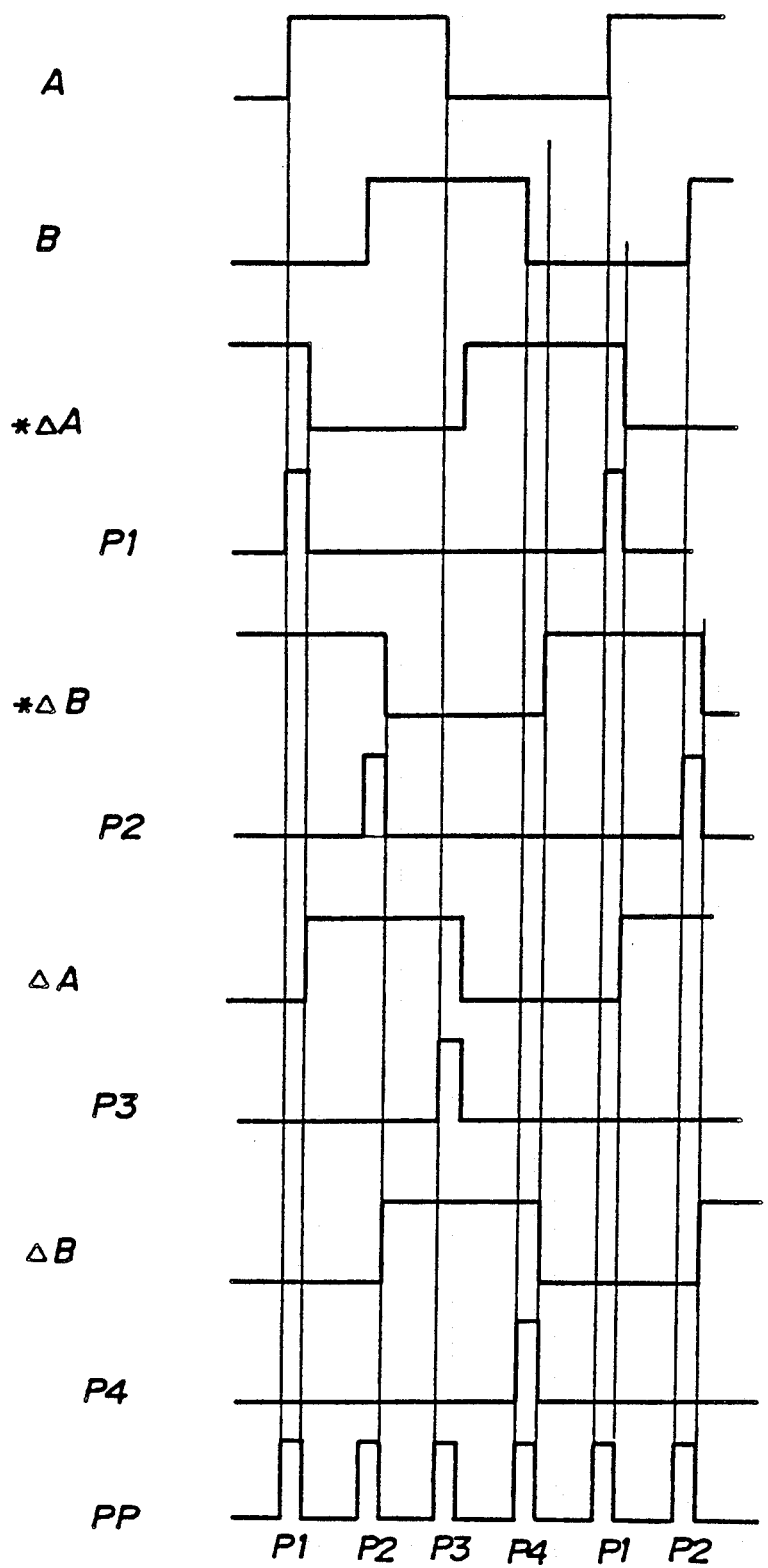
FIG. 4 illustrates waveforms for explaining the operation of a direction discrimination•quadruple circuit in accordance with the present invention.

FIG. 4 illustrates waveforms for explaining the operation of such a direction discrimination•quadruple circuit 13, showing the case where magnetic sensor 11 in FIG. 1 is inclined in the positive direction. In FIG. 4, A and B are, respectively, an A phase signal and a B phase signal which are 90° out of phase with each other; ΔA is a signal delayed for a predetermined time from the A phase signal; ΔB is a signal delayed for a predetermined time from the B phase signal; *ΔA and *ΔB are NOT signals of ΔA and ΔB respectively (* means 'not'); P1 is a positive pulse generated by a logic AND operation of A.*ΔA; P2 is a positive pulse generated by B.*ΔB; P3 is a positive pulse generated by *A.ΔA; P4 is a positive pulse generated by *B.ΔB; and, PP is a positive pulse train which has four positive pulses P1 to P4 per one cycle of an A phase or B phase signal.

Numeral 14 denotes an up/down counter which counts up each time a positive pulse PP is generated and counts down each time a negative pulse NP is generated. Counter 14 has a reset terminal R. The up/down counter 14 is of a four-bit configuration. Counter 14 counts up the positive pulses PP, and, when the count value becomes 15, it returns to 0 on the next positive pulse and continues counting again beginning with 1/ On the other hand, counter 14 counts down the negative pulses NP, and, when the count value becomes 0, it becomes 15 by the next negative pulse NP and continues the counting of negative pulses toward 0 after that.

Numeral 15 denotes a reset signal generation section for generating the system reset signal RS. It resets the up/down counter 14 to zero by a switch for placing the system in a theft surveillance state or by generating a system reset signal upon detection of a door being locked.

Numeral 16 denotes an inclination detection section for sensing an inclination. Numeral 17 denotes a swaying detection section for sensing a swaying of magnetic encoder 11. In the inclination detection section 16, 16a is an inclination range identification circuit and 16b is a time setting circuit.

When an inclination in a positive direction occurs, a positive pulse PP is generated, and the counter value of the up/down counter 14 increases from 0. When an inclination in a reverse direction occurs, a negative pulse NP is generated, and the counter value of the up/down counter 14 decreases from 15.

When an angle variation arises which is to be regarded as an occurrence of an inclination, if the number of positive pulses or negative pulses generated from the direction discrimination quadruple circuit 13 is set at n (e.g., 2), the inclination range identification circuit 16a sets an inclination range in which the lower limit value $N_{SL}$ is 2 and the upper limit value $N_{SU}$ is 14. When a member to be measured is inclined in a positive direction and the counter value becomes 2 or greater, or when the member is inclined in a reverse direction and the counter value becomes 14 or smaller, it is regarded as an occurrence of an inclination, and an inclination generation signal IC is generated.

Figure 5:
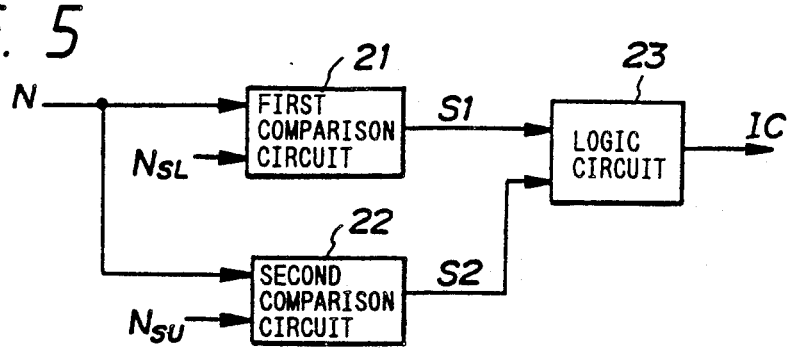
FIG. 5 is a block diagram of an inclination range identification circuit in accordance with the present invention.
Figure 6:
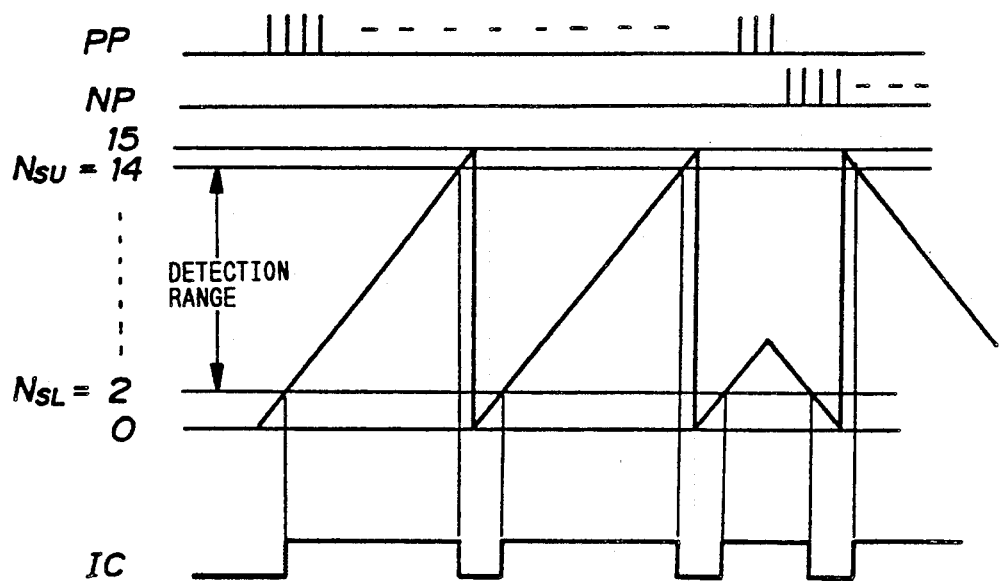
FIGS. 6 and 7 illustrate waveforms for explaining the operation of the circuit of FIG. 5.

FIG. 5 is a block diagram of an embodiment of the inclination range identification circuit 16a. In FIG. 5 are shown a first comparator circuit 21 which outputs a high level signal S1 when $N \geq N_{SL}$ (assume $N_{SL} = 2$), a second comparator circuit 22 which outputs a high-level signal S2 when $N \geq N_{SU}$ (assume $N_{SU} = 14$), and a logic circuit 23 which ANDs the signal S1 with the signal S2 and outputs a high-level inclination generation signal IC when $N_{SL} \leq N \leq N_{SU}$ ($2 \leq N \leq 14$). Therefore, if the member is inclined in a positive direction, a positive pulse PP is generated as shown in FIG. 6, and the counter value N increases from 0 toward 15. When the counter value becomes 15, it returns to 0 and repeats the counting. A high-level inclination generation signal IC is generated in the detection range of $2 \leq N \leq 14$. When the member is inclined in a reverse direction, a negative pulse NP is generated. The counter value N decreases in a reverse direction, and a high-level inclination generation signal IC is output in the detection range of $2 \leq N \leq 14$.

Figure 7:
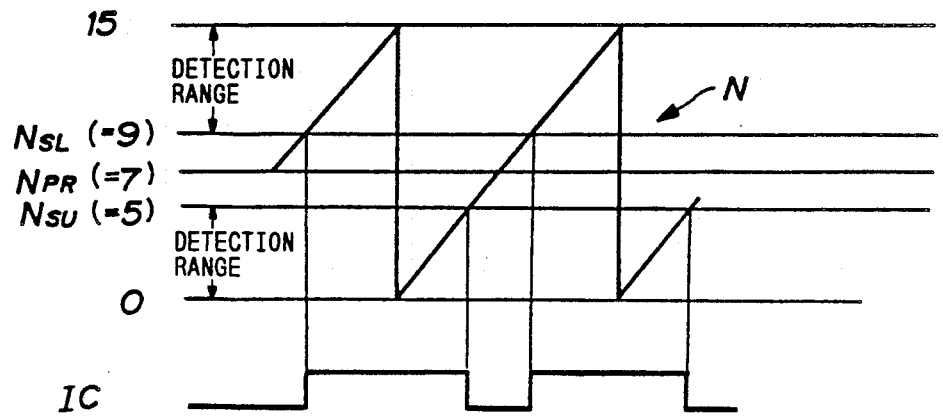

FIG. 7 shows an example in which the up/down counter 14 is preset to 7 at an initial time. Thus, in this instance, $N_{SL} = 9$ and $N_{SU} = 5$. Consequently, an inclination generation signal IC is output when $N_{SL} \leq N$ or $N \leq N_{SU}$.

An inclination sufficient to produce a high-level inclination generation signal IC is easily produced by a vibration due to strong winds. In such a case, a high-level inclination generation signal IC is frequently generated in a short period of time. For this reason, in the present invention, the high-level period of the inclination generation signal IC is monitored by time setting circuit 16b, and, when the time period during which IC is generated is shorter than the set time, the inclination is regarded as having been due to winds and the like, and a true inclination generation signal IC' is not outputted.

Figure 8A:
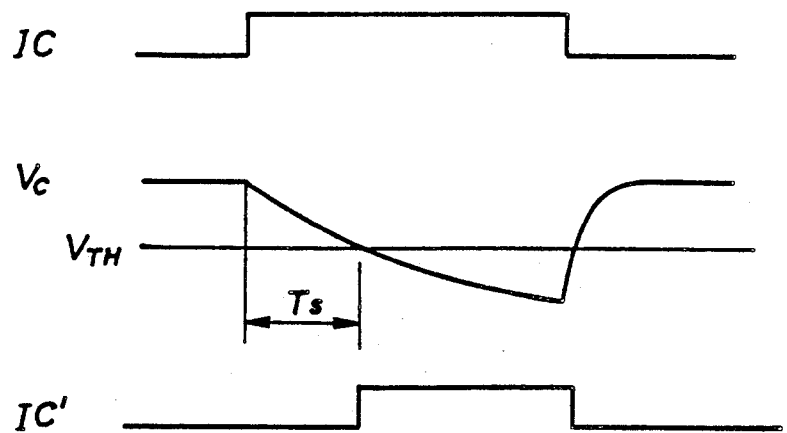
FIGS. 8(a)-8(c) illustrate waveforms for explaining the operation of a time setting circuit.

FIG. 8 illustrates waveforms for explaining the operation of the time setting circuit 16b. If someone tries to steal a vehicle and tilts it, the vehicle is inclined relatively slowly, resulting in $N \geq 2$, and a high-level inclination generation signal IC is generated. As a result of this, a transistor Tr, shown in FIG. 1, is turned on. The capacitor C, charged until that time, begins discharging in the path of C—>R2—>Tr (time constant is C=R2, R2=2.2 MΩ), and the capacitor terminal voltage $V_C$ attenuates as shown in FIG. 8(a). In this case, since the pulse width of the inclination generation signal IC is wide, the capacitor is fully discharged, and the terminal voltage $V_C$ falls below the threshold level $V_{TH}$ (low level) after an elapse of a set time $T_S$, so a true inclination generation signal IC' is generated.

Figure 8B:
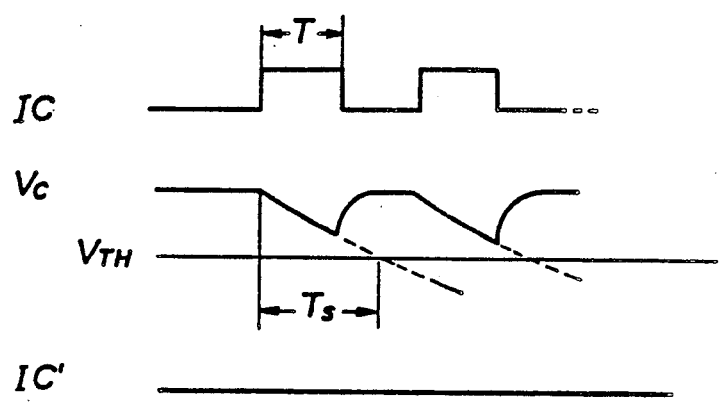

However, as shown in FIG. 8(b), if a vehicle vibrates suddenly or inclines due to wind or the like, even when an inclination generation signal IC is generated, the terminal voltage $V_C$ does not fall below the threshold level, since its high-level period T is shorter than the set time $T_S$ (FIG. 8(b)), so a true inclination generation signal IC' is not generated. In other words, even if the relation $N_{SL} \leq N \leq N_{SU}$ holds and an inclination is detected, when a vehicle inclines suddenly or vibrates, it is regarded as being caused by natural phenomena such as wind, and a true inclination generation signal IC' is not generated.

Figure 8C:
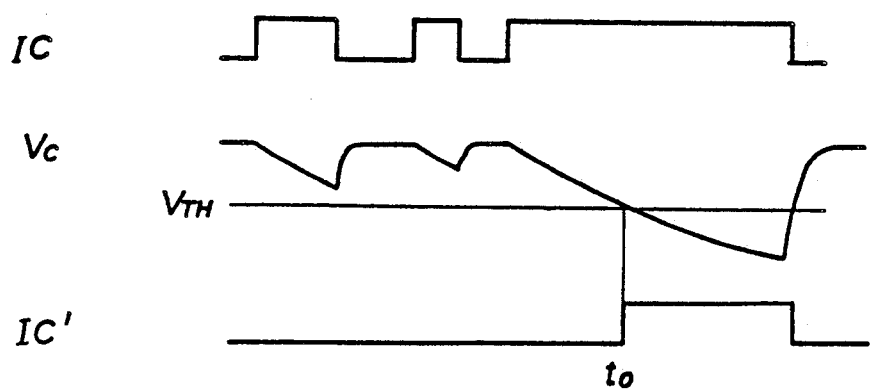

With regard to another cause of inclination, when a vehicle is lifted with a hydraulic jack, the vehicle inclines gradually, accompanied by a rapid swaying or shock, as shown in FIG. 8(c). If a vehicle continues to incline at time $t_0$ shown in FIG. 8(c), when there is no such swaying or shock, a true inclination generation signal IC' is output.

The swaying detection section 17 determines whether an inclination is larger than a predetermined angle, and as a result of this determination generates a swaying generation signal SW. If swaying detection section 17 is set to have a swaying detection range defined by a lower limit value $S_{SL}$ of 7 and an upper limit value $S_{SU}$ of 9, when the vehicle sways in a positive direction and the count value outputted by counter 14 is 7 or greater, or when the vehicle sways in a reverse direction and the count value is 9 or smaller, it is assumed that a swaying has occurred and a swaying generation signal SW is output. The swaying detection section 17 can be arranged in the same way as the inclination range identification circuit 16a.

Figure 9:
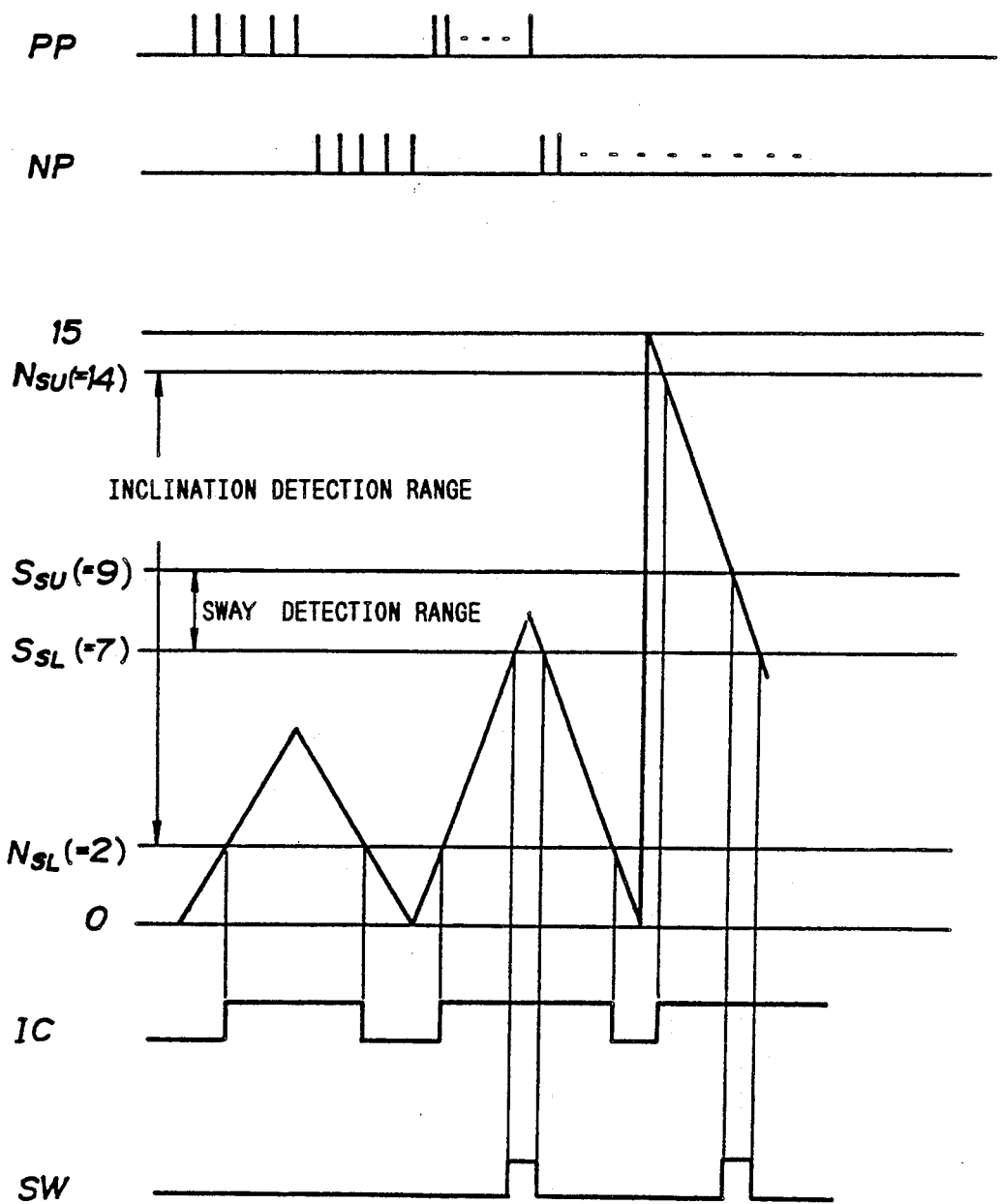
FIG. 9 illustrates waveforms for explaining the inclination and swaying detection of the motion detecting device in accordance with the present invention.

FIG. 9 illustrates waveforms for explaining inclination detection range and swaying detection range. The swaying detection range is narrower than the inclination detection range. Therefore, for a small inclination, only an inclination generation signal IC is output. For a large inclination, a swaying generation signal SW, in addition to an inclination generation signal IC, is output.

When the security system is made operable, a system reset signal RS is generated by the reset signal generation section 15 in FIG. 1 to reset the up/down counter 14 to zero (a predetermined value may be preset). After this, an inclination and a swaying are detected by the above-mentioned configuration.

As set forth hereinabove, according to the present invention, a positive pulse train or a negative pulse train are generated by a direction discrimination•quadruple circuit, depending on the direction of the inclination of a member being measured, at the leading and trailing edges of two signals of A phase and B phase generated by an encoder. The positive and negative pulses are counted up or down. When the counter value falls within a first set range, it is assumed that an inclination has occurred. When the counter value falls within a second set range, it is assumed that a swaying has occurred. As a result of this, an inclination or swaying can be detected in a digital form with high precision.

An inclination or swaying can be detected accurately after resetting an up/down counter using a system reset signal, thereby obviating the need to center magnetic resistance elements with respect to a pendulum.

What is claimed is:

1. A motion detecting device, comprising:
   an encoder for generating two signals of A phase and B phase which are out of phase with each other, said two signals being generated as a result of an inclination or swaying of a member being measured;
   a pulse generation section coupled to said encoder for generating positive pulses or negative pulses, depending on whether said member inclines in a positive or negative direction, at each leading or trailing edge of said A phase and B phase signals;
   an up/down counter coupled to said pulse generation section for counting up or down said positive or negative pulses, respectively, and outputting a counter value;
   an inclination detection section for outputting an inclination generation signal when said member being measured inclines in said positive direction, causing said counter value to be above a first set value, or when said member being measured inclines in said negative direction, causing said counter value to be below a second set value; and
   a swaying detection section coupled to said counter for setting a range of counter values and for setting a range of counter values and for detecting an inclination variation larger than a predetermined variation when said counter value outputted by said counter is within said range.

2. A motion detecting device as in claim 1, wherein said inclination detection section includes a time setting circuit for detecting a time interval from a time when said counter value is above said first set value or below said second set value to a time when said counter value is not above said first set value or below said second set value and for generating an inclination generation signal if said time interval is greater than a present time interval.

3. A motion detecting device as in claim 1 wherein said encoder is a magnetic encoder including a pendulum, a drum having a circumferential surface which is magnetized at a predetermined pitch, said drum being rotatable in response to an inclination or swaying of said pendulum, and magnetic resistance elements disposed oppositely facing said circumferential surface of said drum and separated from said circumferential surface by an air gap.

4. A motion detecting device, comprising:
   an encoder for generating two signals of a first phase and a second phase, said two signals being generated as a result of an inclination of a member;
   a pulse generation section coupled to said encoder for generating positive pulses or negative pulses, depending on whether said member inclines in a first or second direction, at each leading and trailing edge of said first phase and second phase signals;
   a counter coupled to said pulse generation section for counting said positive and negative pulses, respectively, and outputting a counter value;
   a first detection section for outputting a first signal when said member inclines in said first direction, causing said counter value to be above a first value, or when said member being measured inclines in said second direction, causing said counter value to be below a second value; and a second detection section coupled to said counter for determining a range of counter values and for detecting an inclination variation larger than a predetermined variation when said counter value is within said range.

5. A motion detecting device as in claim 4, wherein said first detection section includes a time setting circuit for detecting a time interval from a time when said counter value is above said first value or below said second value to a time when said counter value is not above said first value or below said second value and for generating said first signal if said time interval is greater than a predetermined time interval.

6. A motion detecting device as in claim 4, wherein said member is a pendulum and wherein said member is a magnetic encoder which includes said pendulum, a drum having a circumferential surface which is magnetized at a predetermined pitch, said drum being rotatable in response to an inclination of said pendulum, and magnetic resistance elements disposed oppositely facing said circumferential surface of said drum and separated from said circumferential surface by an air gap.

7. A motion detection device, comprising:

an encoder for generating two signals of different phase in response to an inclination of a member;

means for generating positive or negative pulses in response to the two signals;

means for counting a number of said positive pulses and a number of said negative pulses;

means for providing a first signal when said number of counted positive pulses exceeds a first value, or when said number of counted negative pulses exceeds a second value; and means for providing a second signal when said number of counted positive and negative pulses is within a predetermined range.

* * * * *